(12) United States Patent
Lee et al.

(10) Patent No.: US 11,262,592 B2
(45) Date of Patent: Mar. 1, 2022

(54) OPTICAL IDENTIFICATION MODULE

(71) Applicant: Guangzhou Tyrafos Semiconductor Technologies Co., LTD, Guangzhou (CN)

(72) Inventors: Chun-Yu Lee, New Taipei (TW); Hsu-Wen Fu, Kaohsiung (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 227 days.

(21) Appl. No.: 16/742,920

(22) Filed: Jan. 15, 2020

(65) Prior Publication Data

US 2020/0150449 A1    May 14, 2020

Related U.S. Application Data

(63) Continuation-in-part of application No. 16/362,706, filed on Mar. 25, 2019, now abandoned.

(30) Foreign Application Priority Data

Jul. 5, 2018  (TW) .................................. 107123381
Oct. 8, 2019  (TW) .................................. 108136418

(51) Int. Cl.
*G02B 5/20*    (2006.01)
*G02B 27/30*   (2006.01)
*G06K 9/20*    (2006.01)
*G06K 9/00*    (2022.01)

(52) U.S. Cl.
CPC ............. *G02B 27/30* (2013.01); *G02B 5/208* (2013.01); *G06K 9/209* (2013.01); *G06K 9/0004* (2013.01)

(58) Field of Classification Search
None
See application file for complete search history.

(56) References Cited

U.S. PATENT DOCUMENTS

| | | | | |
|---|---|---|---|---|
| 2005/0274871 | A1* | 12/2005 | Li | H01L 27/14623 250/208.1 |
| 2013/0236850 | A1* | 9/2013 | Wu | A61B 1/00172 433/29 |
| 2016/0282174 | A1* | 9/2016 | Hasegawa | G01J 1/0414 |
| 2019/0026523 | A1* | 1/2019 | Shen | H01L 51/5281 |
| 2019/0033976 | A1* | 1/2019 | Cao | G06F 3/0412 |
| 2019/0122025 | A1* | 4/2019 | Gove | G06K 9/0004 |
| 2019/0377858 | A1* | 12/2019 | He | G06F 3/0443 |

* cited by examiner

Primary Examiner — Idowu O Osifade
(74) Attorney, Agent, or Firm — JCIPRNET (57) ABSTRACT

An optical identification module including a sensor and a collimator is provided. The sensor has a plurality of sensing regions. The collimator is disposed on the plurality of sensing regions, and the collimator includes a transparent substrate, a first light shielding layer, and a plurality of microlenses. The first light shielding layer includes a plurality of first openings. The plurality of microlenses are disposed on a first surface of the transparent substrate, and the plurality of microlenses correspond to the plurality of first openings respectively.

8 Claims, 8 Drawing Sheets

OPTICAL IDENTIFICATION MODULE

CROSS-REFERENCE TO RELATED APPLICATION

This application is a continuation-in-part application of and claims the priority benefit of U.S. application Ser. No. 16/362,706, filed on Mar. 25, 2019, which claims the priority benefit of Taiwan application serial no. 107123381, filed on Jul. 5, 2018. This application also claims the priority benefit of Taiwan application serial no. 108136418, filed on Oct. 8, 2019. The entirety of each of the above-mentioned patent applications is hereby incorporated by reference herein and made a part of this specification.

BACKGROUND

Technical Field

The invention relates to an optical module. More particularly, the invention relates to an optical identification module capable of identifying a biometric feature.

Description of Related Art

Along with the development of Internet of Things (IoT) technology, applications of and demands for the biometric identification technology rapidly expand. At present, the biometric identification technology in the market is commonly applied to identify biometric features such as fingerprints, palm prints, vein distribution, iris, retina, or facial features and the like through an optical, a capacitive, or an ultrasonic manner, so as to achieve identity identification or certification. Compared to an identification module capable of identifying biometric features through the capacitive or ultrasonic manner, an optical identification module capable of identifying biometric features through the optical manner may feature advantages such as greater durability and lower costs since biometric feature identification is performed through a sensor in the optical identification module to receive light beams reflected by an object. Nevertheless, the light beams reflected by the object may easily be transmitted to the sensor in a scattering manner, which may lead to poor image capturing quality and affect the identification result.

SUMMARY

The invention provides an optical identification module that has a good identification capability.

An optical identification module of the invention includes a sensor and a collimator. The sensor includes a sensing surface and a plurality of sensing regions, and the plurality of sensing regions are located on the sensing surface. The collimator is disposed on the plurality of sensing regions and includes: a transparent substrate, a first light shielding layer, and a plurality of microlenses. The first light shielding layer is disposed on the sensing surface, wherein the first light shielding layer includes a plurality of first openings, and at least a portion of a region of each of the plurality of sensing regions is exposed from the plurality of first openings. The plurality of microlenses are disposed on a first surface of the transparent substrate, wherein the first light shielding layer is located between the plurality of microlenses and the plurality of sensing regions, and the plurality of microlenses correspond to the plurality of first openings respectively.

An optical identification module of the invention includes a sensor and a collimator. The sensor includes a sensing surface and a plurality of sensing regions, and the plurality of sensing regions are located on the sensing surface. The collimator is disposed on the plurality of sensing regions and includes: a transparent substrate, a first light shielding layer, and a plurality of microlenses. The plurality of microlenses are disposed on a first surface of the transparent substrate. The first light shielding layer is disposed on a panel and located between the plurality of microlenses and the panel, wherein the first light shielding layer includes a plurality of first openings corresponding to the plurality of microlenses and at least portions of regions of the plurality of sensing regions respectively.

In an embodiment of the invention, the optical identification module further includes an infrared cut-off sheet and an absorption layer. The infrared cut-off sheet is disposed on a second surface of the transparent substrate, and the second surface is opposite to the first surface. The absorption layer is disposed on the second surface of the transparent substrate, and the absorption layer is located between the second surface of the transparent substrate and the infrared cut-off sheet.

In an embodiment of the invention, there is a pitch between adjacent ones of the plurality of sensing regions, and a diameter of each of the microlenses is less than or equal to the pitch.

In an embodiment of the invention, a ratio of the pitch to a width of each of the sensing regions is greater than a positive square root of 2.

In an embodiment of the invention, a ratio of a thickness of the first light shielding layer to a width of each of the first openings is greater than a positive square root of 2.

Based on the above, in the optical identification module of the invention, a light beam transmitted to the sensor is collimated using the collimator to effectively relieve optical crosstalk, thereby reducing optical noise and improving an image resolution. In addition, the optical identification module is easy to fabricate, so production costs can be reduced. Therefore, the optical identification module of the invention can have a good identification capability, and is easy to fabricate, facilitating industrial competition and development.

To make the features and advantages of the invention clear and easy to understand, the following gives a detailed description of embodiments with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the drawings, common characteristics of the methods, structures and/or materials used in specific exemplary embodiments are shown. However, the drawings are not limited to the structures or features of the following embodiments and the drawings should not be interpreted to define or limit the scopes or the properties of the descriptions in the exemplary embodiments. For instance, the relative thickness and location of each film layer, region, and/or structure may be reduced or enlarged for clarity.

The use of similar or the same reference numerals in the drawings is intended to indicate the presence of similar or the same elements or features. Similar reference numerals in the drawings represent similar elements, and related description thereof is omitted.

Optical identification modules listed in the following embodiments are adapted to capture a biometric feature of an object. The object may be a finger or a palm. Correspondingly, the biometric feature may be fingerprints, veins, or palm prints, but is not limited in this regard.

Figure 1:
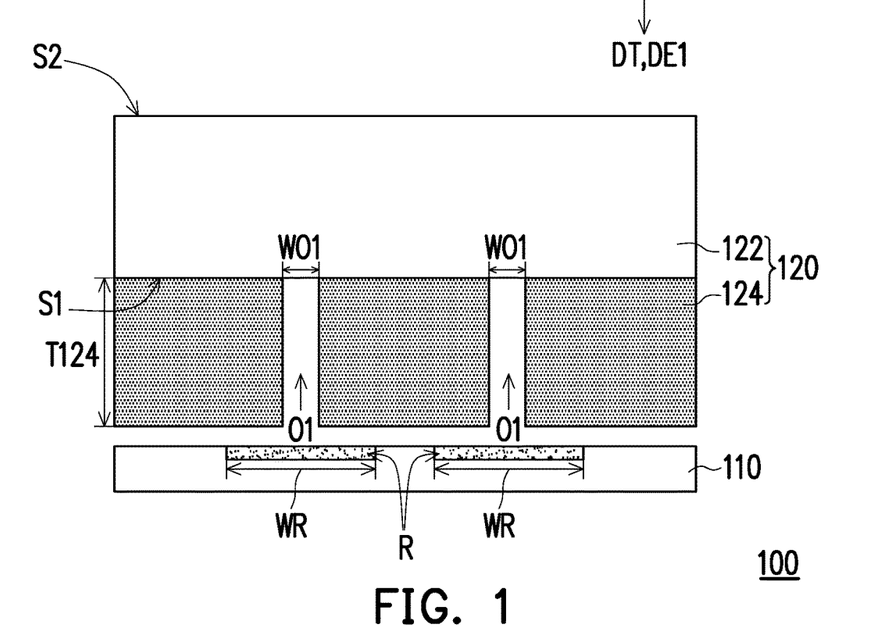
FIG. 1 to FIG. 7 are schematic cross-sectional views of optical identification modules according to a first to a seventh embodiments of the invention.

FIG. 1 to FIG. 7 are schematic cross-sectional views of optical identification modules according to a first to a seventh embodiments of the invention. With reference to FIG. 1, an optical identification module 100 of the first embodiment includes a sensor 110 and a collimator 120.

The sensor 110 is adapted to receive light beams (i.e., light beams carrying biometric feature information, not shown) reflected by the object (not shown). For instance, the sensor 110 may include a charge coupled device (CCD), a complementary metal-oxide semiconductor (CMOS), or optical sensing devices of other suitable types.

The sensor 110 has a plurality of sensing regions R. The sensing regions R are a plurality of light-collecting regions in the sensor 110. When the sensor 110 adopts a plurality of charge coupled devices to collect light beams, each of the sensing regions R is a region where each of the charge coupled devices is located. On the other hand, when the sensor 110 adopts a complementary metal-oxide semiconductor to collect light beams, the sensing regions R are a plurality of pixel regions in the complementary metal-oxide semiconductor.

The collimator 120 is disposed on the sensing regions R. To be specific, the collimator 120 is disposed between the object and the sensor 110, so as to collimate the light beams reflected by the object and transmitted towards the sensor 110. In this way, optical disturbance is improved, optical noise reduction is achieved, and image resolution is increased.

Further, the collimator 120 includes a transparent substrate 122 and a first light shielding layer 124. The transparent substrate 122 may be any carrier allowing light beams to pass through. For instance, the transparent substrate 122 may include a glass substrate or a plastic substrate, but is not limited in this regard.

The transparent substrate 122 has a first surface S1 and a second surface S2 opposite to the first surface S1. The first light shielding layer 124 is disposed on the first surface S1 of the transparent substrate 122. In this embodiment, the first surface S1 is located between the second surface S2 and the sensor 110. That is, the first surface S1 is a surface of the transparent substrate 122 facing the sensor 110, and the second surface S2 is a surface of the transparent substrate 122 facing away from the sensor 110. Hence, the first light shielding layer 124 is located between the transparent substrate 122 and the sensor 110. In another embodiment, the collimator 120 may be placed upside down, so that the first surface S1 on which the first light shielding layer 124 is disposed faces away from the sensor 110, and the second surface S2 faces the sensor 110. In this way, the transparent substrate 122 is located between the first light shielding layer 124 and the sensor 110.

The first light shielding layer 124 is adapted to shield the scattered light, and the first light shielding layer 124 may be made of any material capable of shielding the light. For instance, the light-shielding material may include a light absorption material, but is not limited in this regard. For instance, the material of the first light shielding layer 124 may include black ink or a black photoresist. Besides, the first light shielding layer 124 may be formed on the first surface S1 through printing. Nevertheless, the material and color of the first light shielding layer 124 and a manner through which the first light shielding layer 124 is formed on the first surface S1 may be changed according to needs and are not limited to the above.

Since the collimator 120 is disposed between the object and the sensor 110, in order to allow the sensor 110 to receive the light beams (i.e., the light beams carrying the biometric feature information) reflected by the object, the first light shielding layer 124 of the collimator 120 includes a plurality of first openings O1 disposed corresponding to the sensing regions R of the sensor 110. As such, the light beams reflected by the object may be transmitted to the sensor 110 through the first openings O1.

A size of each of the first openings O1 (e.g., a width WO1 of each of the first openings O1) is less than or equal to a size of each of the sensing regions R (a width WR of each of the sensing regions R), so that the light beams in each of the first openings O1 are transmitted to the corresponding sensing region R. The width (e.g., the width WO1 of each of the first openings O1 and the width WR of each of the sensing regions R) may be a diameter of each of the openings/regions (in response to that a shape of each of the openings/regions is a circle) or a diagonal length of each of the openings/regions (in response to that the shape of each of the openings/regions is a quadrilateral).

In this embodiment, the first openings O1 and the sensing regions R are disposed through a one-to-one relationship, that is, each of the sensing regions R has one first opening O1 disposed thereon. Nevertheless, in another embodiment, the first openings O1 and the sensing regions R may be disposed through a many-to-one relationship, that is, each of the sensing regions R has plural first openings O1 disposed thereon.

Each of the first openings O1 may be filled with or may not be filled with a transparent material according to needs. In this embodiment, each of the first openings O1 is not filled with any material. That is, a light transmission medium in each of the first openings O1 is air. Nevertheless, in another embodiment, each of the first openings O1 may be filled with a transparent material. That is, the light transmission medium in each of the first openings O1 is the transparent material. A refractive index of the transparent material is preferably equal to or close to a refractive index of the transparent substrate 122, so as to reduce optical loss caused by interface reflection or light beam transmission path changes.

According to different design requirements, an included angle between an extending direction DE1 of each of the first openings O1 and a thickness direction DT of the transparent substrate 122 falls in the range of 0 degrees to 45 degrees. In this embodiment, the included angle (not shown) between the extending direction DE1 and the thickness direction DT is 0 degrees. In other words, each of the first openings O1 extends in the thickness direction DT of the transparent substrate 122, but the invention is not limited thereto.

A collimation effect on the light beams transmitted towards the sensing regions R is related to a thickness T124 of each of the first light shielding layer 124 and the width WO1 of each of the first openings O1. In response to that the thickness of the first light shielding layer 124 increases and/or the width of each of the first openings O1 decreases, the collimation effect on the light beams becomes more evident. Conversely, in response to that the thickness of the first light shielding layer 124 decreases and/or the width of each of the first openings O1 increases, the collimation effect on the light beams becomes less evident. In order to effectively collimate the light beams (e.g., shielding/absorbing, through the first light shielding layer 124, the large-angle light beam in the light beams transmitted towards the sensing regions R), a ratio (T124/WO1) of the thickness T124 of the first light shielding layer 124 to the width WO1 of each of the first openings O1 is greater than 1. Through the foregoing design, optical disturbance may be effectively improved, optical noise reduction is achieved, and image resolution is increased, so that the optical identification module 100 may feature a favorable identification capability.

The optical identification module 100 may further include other elements according to different needs. For instance, the optical identification module 100 may further include a light source, but is not limited in this regard.

Figure 2:
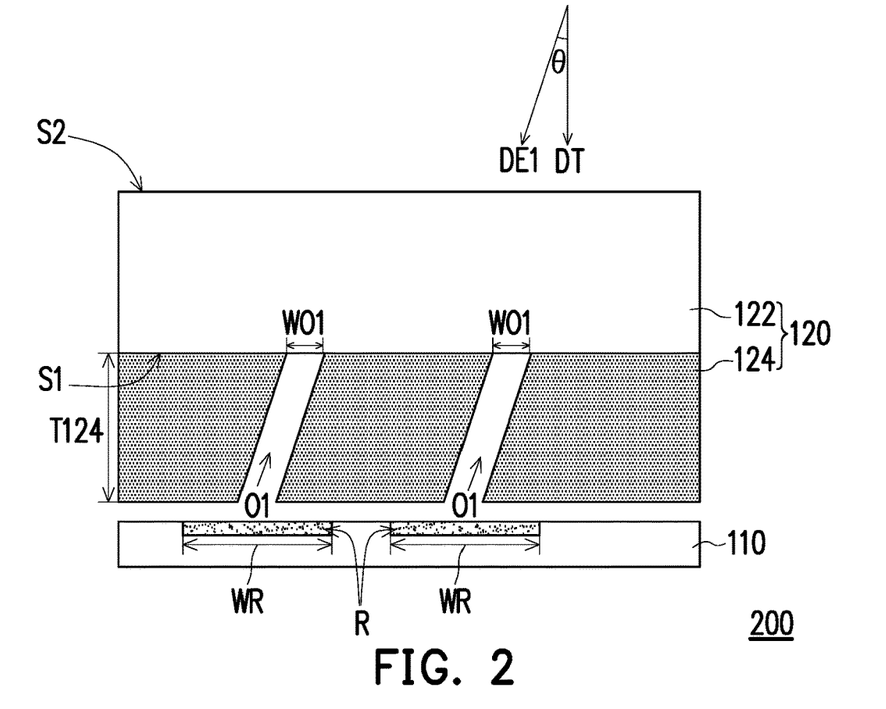

With reference to FIG. 2, a main difference between an optical identification module 200 of the second embodiment and the optical identification module 100 in FIG. 1 is described as follow. In the optical identification module 200, the included angle θ between the extending direction DE1 of each of the first openings O1 and the thickness direction DT of the transparent substrate 122 is greater than 0 degrees and is less than or equal to 45 degrees.

Figure 3:
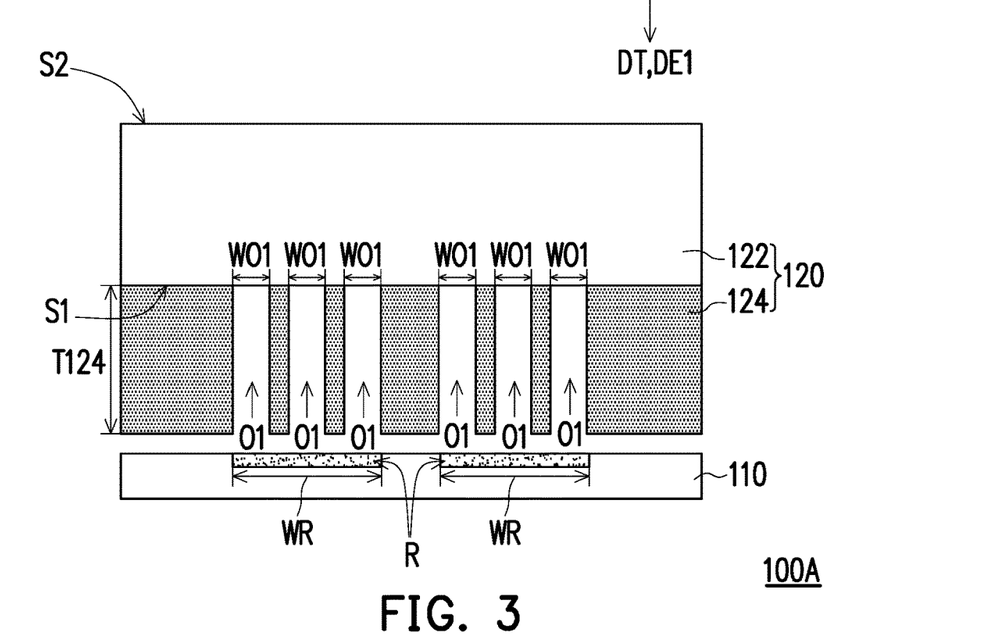

With reference to FIG. 3, a main difference between an optical identification module 100A of the third embodiment and the optical identification module 100 in FIG. 1 is described as follow. In the optical identification module 100A, the first openings O1 and the sensing regions R are disposed through a many-to-one relationship, that is, each of the sensing regions R has plural first openings O1 disposed thereon.

Figure 4:
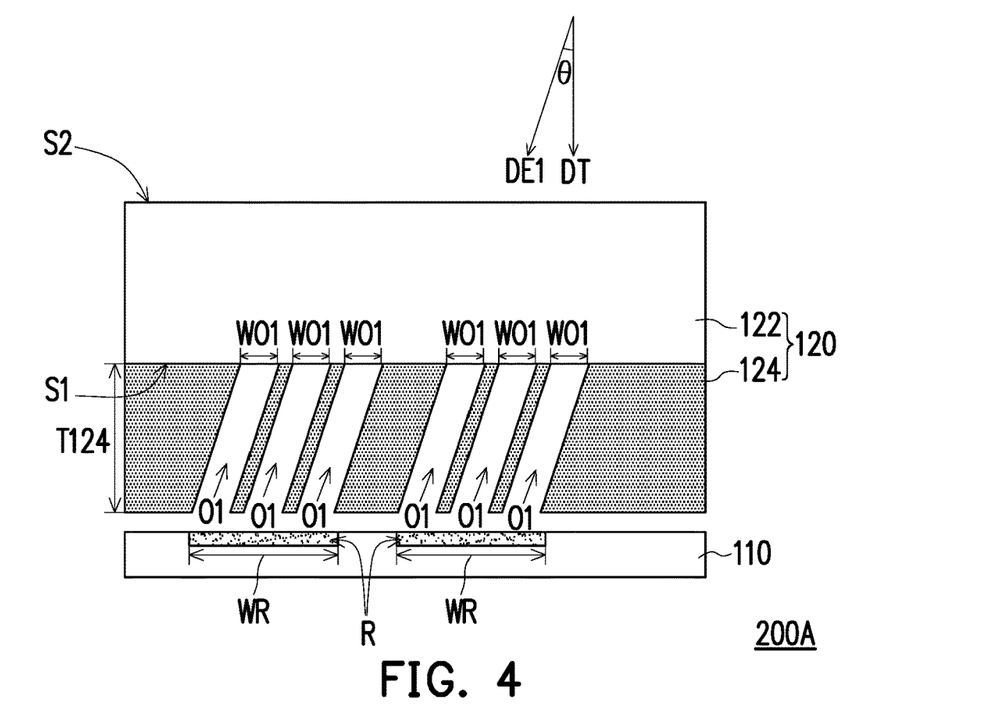

With reference to FIG. 4, a main difference between an optical identification module 200A of the fourth embodiment and the optical identification module 200 in FIG. 2 is described as follow. In the optical identification module 200A, the first openings O1 and the sensing regions R are disposed through a many-to-one relationship, that is, each of the sensing regions R has plural first openings O1 disposed thereon.

Figure 5:
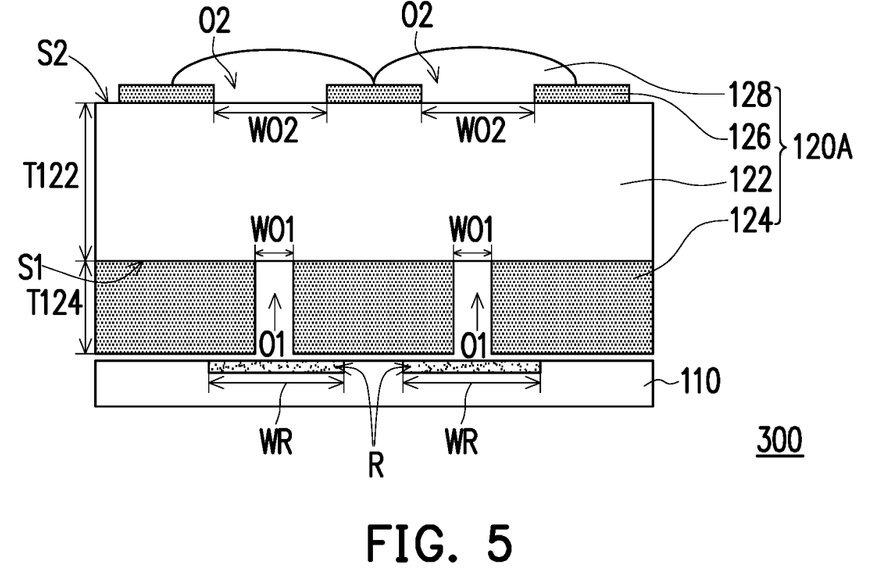

With reference to FIG. 5, a main difference between an optical identification module 300 of the fifth embodiment and the optical identification module 100 in FIG. 1 is described as follow. In the optical identification module 300, a collimator 120A further includes a second light shielding layer 126 and a plurality of microlenses 128 in addition to the transparent substrate 122 and the first light shielding layer 124.

The second light shielding layer 126 is disposed on the second surface S2 of the transparent substrate 122. In other words, the second light shielding layer 126 and the first light shielding layer 124 are respectively located at two opposite sides of the transparent substrate 122.

The second light shielding layer 126 is adapted to shield scattered light as well, and the second light shielding layer 126 may be made of any material capable of shielding light. For instance, the light-shielding material may include a light absorption material, but is not limited in this regard. For instance, the material of the second light shielding layer 126 may include black ink or a black photoresist. Besides, the second light shielding layer 126 may be formed on the second surface S2 through printing. Nevertheless, the material and color of the second light shielding layer 126 and a manner through which the second light shielding layer 126 is formed on the second surface S2 may be changed according to needs and are not limited to the above.

The second light shielding layer 126 includes a plurality of second openings O2 disposed corresponding to the plurality of first openings O1 of the first light shielding layer 124, and a size of each of the second openings O2 (e.g., a width WO2 of each of the second openings O2) may be greater than or equal to the size of each of the first openings O1 (e.g., the width WO1 of each of the first openings O1).

The microlenses 128 are disposed on the second surface S2 and are respectively located in the second openings O2. Further, the microlenses 128 are adapted to converge light beams, so as to help the sensor 110 to receive more light beams reflected by the object. In this embodiment, the microlenses 128 are arranged on the second surface S2 in an array form, and the microlenses 128 and the sensing regions R are disposed through a one-to-one relationship. Nevertheless, in another embodiment, the microlenses 128 and the sensing regions R may also be disposed through a many-to-one relationship.

A refractive index of the microlenses 128 is preferably equal to or close to the refractive index of the transparent substrate 122, so as to reduce optical loss caused by interface reflection or light beam transmission path changes. For instance, an absolute value of a difference in refractive index between the microlenses 128 and the transparent substrate 122 is preferably less than 0.1. In addition, a radius of curvature of each of the microlenses 128 is less than a ratio (T122/WR) of the thickness T122 of the transparent substrate 122 to the width WR of each of the sensing regions R, so that a favorable convergence effect is achieved.

In this embodiment, each of the first openings O1 may be filled with or may not be filled with a transparent material according to needs. In addition, the microlenses 128 may not be included in the collimator 120A. Under such configuration, each of the second openings O2 may be filled with or may not be filled with a transparent material according to needs as well. Besides, the optical identification module 300 may further include other elements according to different needs. Related description may be found with reference to the foregoing, which is not further illustrated herein.

Figure 6:
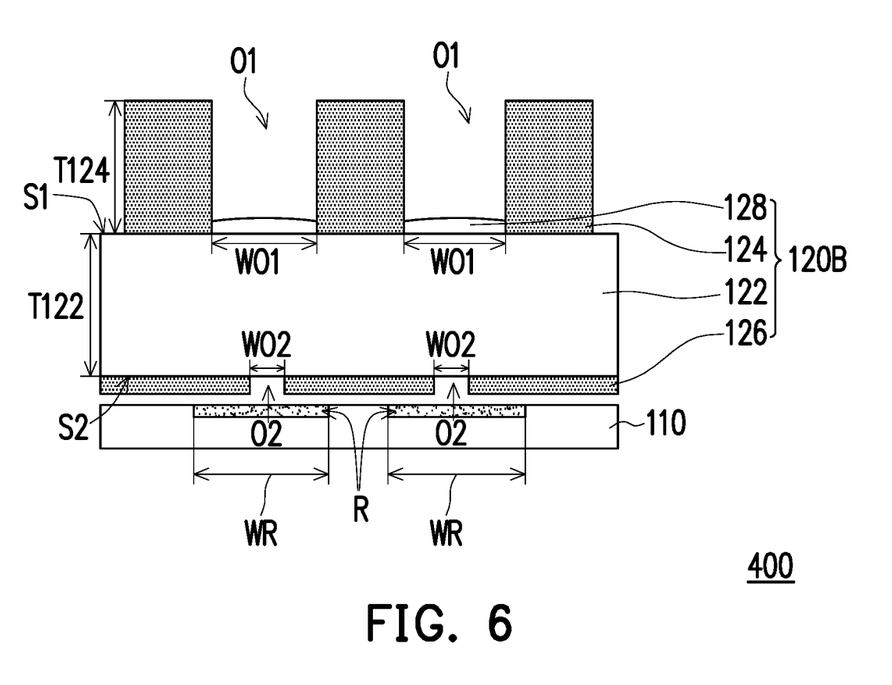

With reference to FIG. 6, a main difference between an optical identification module 400 of the sixth embodiment and the optical identification module 300 in FIG. 5 is described as follow. In the optical identification module 400, the first surface S1 on which the first light shielding layer 124 is disposed faces away from the sensor 110, and the second surface S2 on which the second light shielding layer 126 is disposed faces the sensor 110. In this way, the transparent substrate 122 is located between the first light shielding layer 124 and the sensor 110.

In addition, the size of each of the second openings O2 (e.g., the width WO2 of each of the second openings O2) is less than or equal to the size of each of the sensing regions R (the width WR of each of the sensing regions R). Further, the size of each of the first openings (e.g., the width WO1 of each of the first openings O1) is greater than or equal to the size of each of the second openings O2 (e.g., the width WO2 of each of the second openings O2).

The microlenses 128 are disposed on the first surface S1 and are respectively located in the first openings O1. In this embodiment, the microlenses 128 are arranged on the first surface S1 in an array form, and the microlenses 128 and the sensing regions R are disposed through a one-to-one relationship. Nevertheless, in another embodiment, the microlenses 128 and the sensing regions R may be disposed through a many-to-one relationship. Related design of the microlenses 128 may be found with reference to the foregoing, which is not further illustrated herein.

In this embodiment, each of the second openings O2 may be filled with or may not be filled with a transparent material according to needs. In addition, the microlenses 128 may not be included in the collimator 120B. Under such configuration, each of the first openings O1 may be filled with or may not be filled with a transparent material according to needs as well. Besides, the optical identification module 400 may further include other elements according to different needs. Related description may be found with reference to the foregoing, which is not further illustrated herein.

Figure 7:
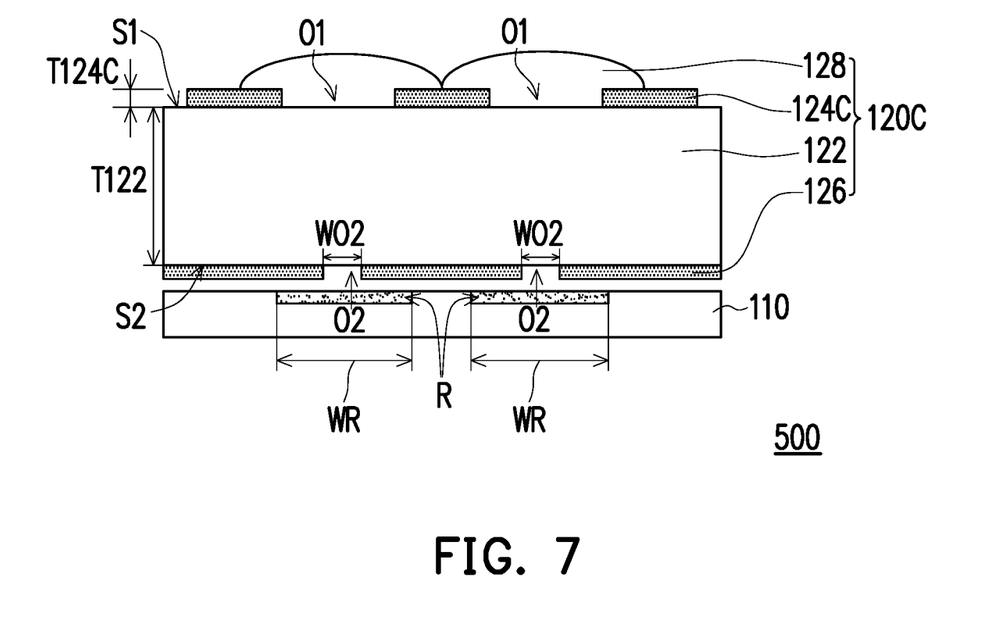

With reference to FIG. 7, a main difference between an optical identification module 500 of the seventh embodiment and the optical identification module 400 in FIG. 6 is described as follow. In the optical identification module 500, a first light shielding layer 124C of a collimator 120C is thinner than the first light shielding layer 124 of the collimator 120B in FIG. 6. That is, a thickness T124C is less than the thickness T124. Further, a ratio (T124C/WO1) of the thickness T124C of the first light shielding layer 124C to the width WO1 of each of the first openings O1 may be less than or equal to 1. Hence, the optical identification module 500 may feature a thinner thickness.

In this embodiment, each of the second openings O2 may be filled with or may not be filled with a transparent material according to needs. In addition, the microlenses 128 may not be included in the collimator 120C. Under such configuration, each of the first openings O1 may be filled with or may not be filled with a transparent material according to needs as well. Besides, the optical identification module 500 may further include other elements according to different needs. Related description may be found with reference to the foregoing, which is not further illustrated herein.

Figure 8A:
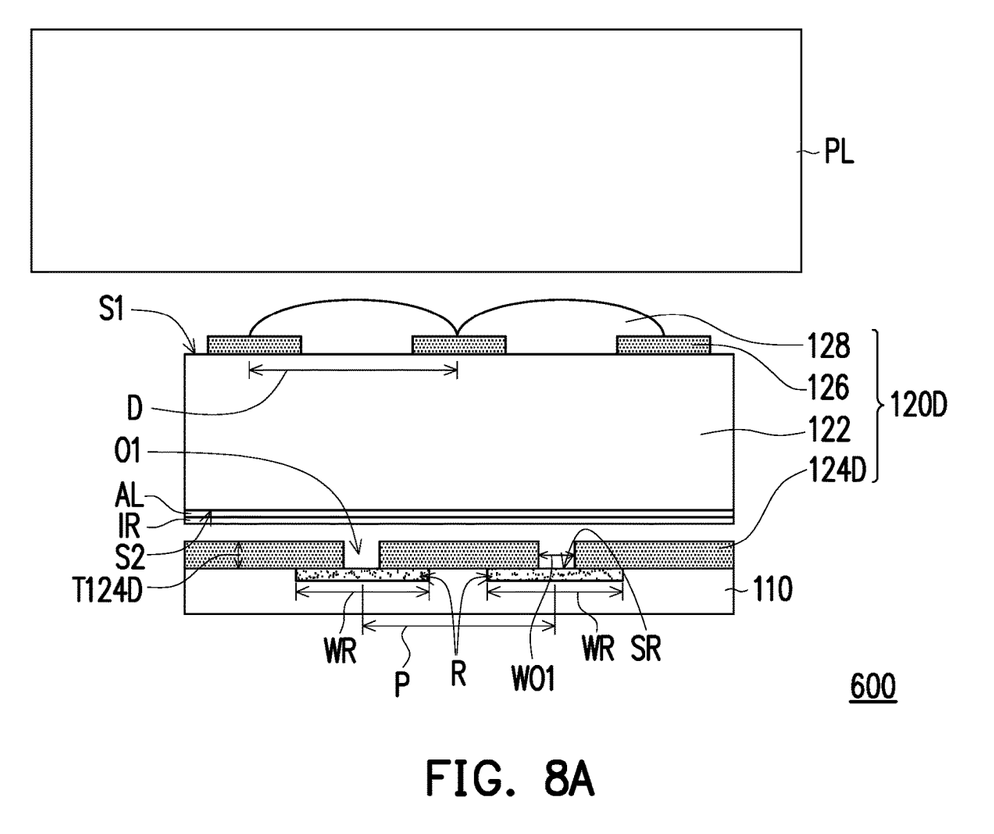
FIG. 8A is a schematic cross-sectional view of an optical identification module according to an eighth embodiment of the invention.
Figure 8B:
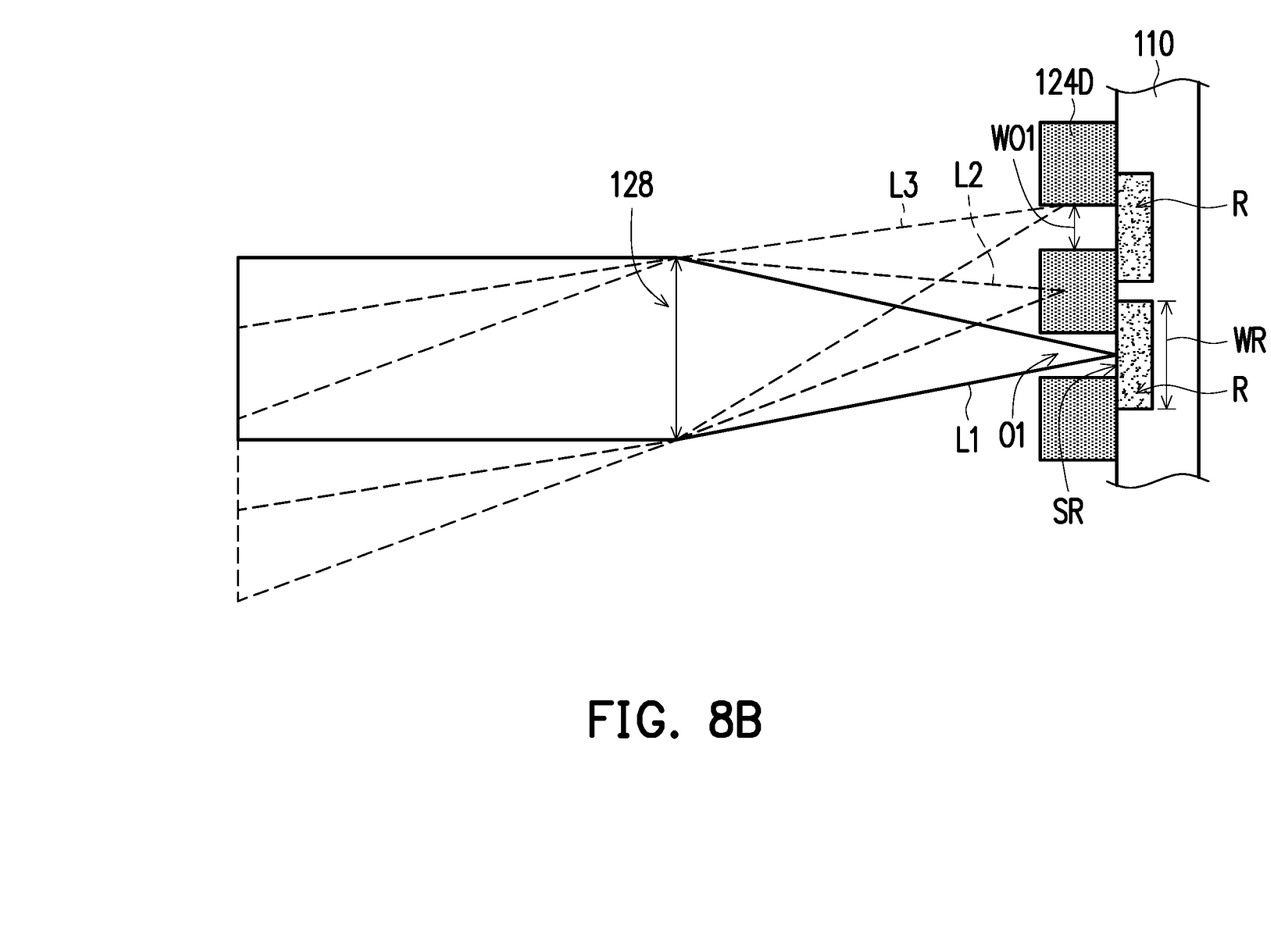
FIG. 8B and FIG. 8C are schematic diagrams of an optical path of an optical identification module in FIG. 8A.
Figure 8C:
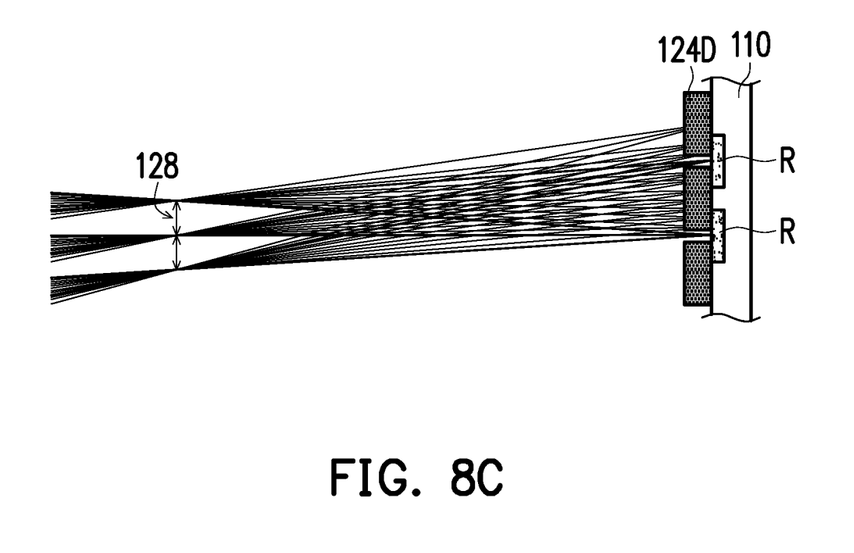

FIG. 8A is a schematic cross-sectional view of an optical identification module according to an eighth embodiment of the invention. FIG. 8B and FIG. 8C are schematic diagrams of an optical path of an optical identification module in FIG. 8A. With reference to FIG. 8A, a main difference between an optical identification module 600 in the eighth embodiment and the optical identification module 300 in FIG. 5 is as follows. In the optical identification module 600, a first light shielding layer 124D of a collimator 120D is disposed on a sensing surface SR of a sensor 110, so that the first light shielding layer 124D is located between the microlenses 128 and the plurality of sensing regions R of the sensor 110. In addition, as shown in FIG. 8A, in the present embodiment, a plurality of microlenses are disposed on the first surface S1 of the transparent substrate 122, and the plurality of microlenses 128 correspond to the plurality of first openings O1 respectively.

As described above, in the present embodiment, the collimation effect on the light beams transmitted toward the sensing regions R is related to a thickness T124D of the first light shielding layer 124D and the width WO1 of each of the first openings O1. When the first light shielding layer 124D is thicker and/or each of the first openings O1 is narrower, the collimation effect on the light beams becomes more evident. Conversely, when the first light shielding layer 124D is thinner and/or each of the first openings O1 is wider, the collimation effect on the light beams becomes less evident. In order to effectively collimate the light beam (for example, a large-angle light beam in the light beams transmitted toward the sensing regions R is shielded/absorbed through the first light shielding layer 124D), a required value of a ratio (T124D/WO1) of the thickness T124D of the first light shielding layer 124D to the width WO1 of each of the first openings O1 is adjusted as needed. However, a larger ratio (T124D/WO1) of the thickness T124D of the first light shielding layer 124D to the width WO1 of each of the first openings O1 indicates a more difficult fabricating process.

Accordingly, as shown in FIG. 8A, in the present embodiment, the first light shielding layer 124D is disposed on the sensing surface SR of the sensor 110, so that most large-angle light beams in the light beams transmitted toward the sensing regions R can be shielded/absorbed more effectively, thereby reducing the required value of the ratio (T124D/WO1) of the thickness T124D of the first light shielding layer 124D to the width WO1 of each of the first openings O1, and fabrication is easy. In particular, as shown in FIG. 8A to FIG. 8C, in the present embodiment, at least a portion of a region of each of the plurality of sensing regions R is exposed from the plurality of first openings O1 of the first light shielding layer 124D, and the plurality of microlenses 128 correspond to the plurality of first openings O1 respectively. As such, as shown in FIG. 8B and FIG. 8C, since the microlenses 128 are adapted to converge light beams, a small-angle light beam L1 in the light beams transmitted toward the sensing regions R can still be transmitted to the corresponding sensing regions R via the first opening O1. Large-angle light beams L2 and L3 transmitted toward the sensing regions R are transmitted, after being refracted by the microlenses 128, to the first light shielding layer 124D provided on the sensing surface SR of the sensor 110 to be shielded/absorbed by an upper surface or a side surface of the first light shielding layer 124D, thereby preventing the large-angle light beams from being transmitted to the sensing regions R of the sensor 110.

For example, as shown in FIG. 8B and FIG. 8C, in the present embodiment, there is a pitch P between adjacent ones of the plurality of sensing regions R, and each of the microlenses 128 has a diameter D less than or equal to the pitch P. A ratio of the pitch P to the width WR of each of the sensing regions R is greater than or equal to a positive square root of 2. The ratio of the thickness T124D of the first light shielding layer 124D to the width WO1 of each of the first openings O1 is greater than or equal to a positive square root of 2. In this way, the required value of the ratio (T124D/WO1) of the thickness T124D of the first light shielding layer 124D to the width WO1 of each of the first openings O1 can be reduced, and fabrication is easy. In addition, the optical identification module 600 can have a good identification capability. For example, in the present embodiment, the ratio (T124D/WO1) of the thickness T124D of the first light shielding layer 124D to the width WO1 of each of the first openings O1 may be between a positive square root of 2 and 12.

In addition, as shown in FIG. 8A, in the present embodiment, the optical identification module 600 further includes an infrared IR cut-off sheet. The infrared IR cut-off sheet is disposed on the second surface S2 of the transparent substrate 122. The infrared IR cut-off sheet may be configured to reflect or absorb incident light in a near-infrared band to prevent the incident light in the infrared band from being transmitted to the sensing regions R of the sensor 110, thereby preventing the sensor 110 from being affected. In addition, the optical identification module 600 may optionally further include an absorption layer AL to further prevent quality of a display picture of a panel PL from being affected. In particular, as shown in FIG. 8A, in the present embodiment, the absorption layer AL is disposed on the second surface S2 of the transparent substrate 122, and is located between the second surface S2 of the transparent substrate 122 and the infrared IR cut-off sheet. Further, in the present embodiment, the absorption layer AL may be configured to absorb a ray of light reflected by the infrared IR cut-off sheet to prevent a user from observing the ray of light reflected by the infrared cut-off piece IR, thereby preventing the quality of the display picture of the panel PL from being affected.

In this way, through the foregoing design, optical interference can be effectively relieved, optical noise is reduced, and an image resolution is improved, so that the optical identification module 600 has a good identification capability. In addition, the optical identification module is easy to fabricate, so production costs can be reduced. In addition, the optical identification module 600 may further include other elements according to different requirements. For related instructions, refer to the foregoing descriptions, and the descriptions thereof are omitted herein.

Figure 9:
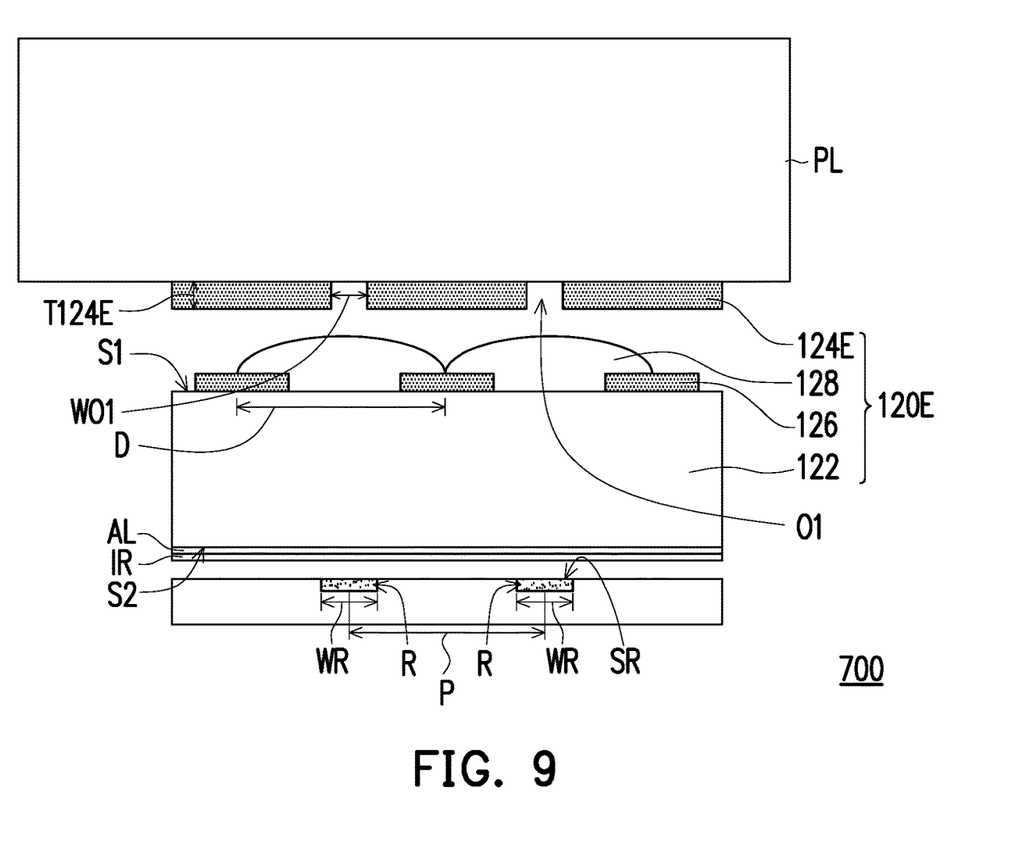
FIG. 9 is a schematic cross-sectional view of an optical identification module according to a ninth embodiment of the invention.

FIG. 9 is a schematic cross-sectional view of an optical identification module according to a ninth embodiment of the invention. With reference to FIG. 9, a main difference between an optical identification module 700 in the ninth embodiment and the optical identification module 600 in FIG. 8A is as follows. The optical identification module 700 further includes a panel PL, and a first light shielding layer 124E of a collimator 120E is disposed on a surface of the panel PL facing the microlenses 128. For example, the panel PL may be a display panel or a cover glass of a mobile phone, and is adapted to be passed through by a light beam (that is, a light beam with biometric information, not shown) reflected by a to-be-tested object (not shown). The light beam is transmitted to the plurality of sensing regions R of the sensor 110.

Further, as shown in FIG. 9, in the present embodiment, the plurality of first openings O1 correspond to the plurality of microlenses 128 and at least portions of regions of the sensing regions R respectively. Moreover, an area of each of the sensing regions R, that is, the width WR of each of the sensing regions, of the sensor 110 may be correspondingly reduced. In other words, in the present embodiment, the sensing regions R merely need to be disposed on a portion of the region of the sensing surface SR corresponding to the plurality of first openings O1 and the plurality of microlenses 128.

As such, the first light shielding layer 124E is disposed on the surface of the panel PL facing the microlenses 128, so that before a light beam is transmitted to the microlenses 128, most large-angle light beams in the light beams transmitted toward the sensing regions R can be shielded/absorbed effectively by the first light shielding layer 124E, thereby reducing a required value of a ratio (T124E/WO1) of a thickness T124E of the first light shielding layer 124E to the width WO1 of each of the first openings O1, and fabrication is easy. Moreover, the area of each of the sensing regions R is reduced, so that stray light transmitted to the sensing regions R of the sensor 110 can be greatly reduced, and through the configured microlenses 128, a small-angle light beam in the light beams transmitted toward the sensing regions R can still be converged on a region on the sensing surface SR of the sensor 110 where the sensing regions R are disposed.

In this way, through the foregoing design, optical interference can also be effectively relieved, optical noise is reduced, and an image resolution is improved, so that the optical identification module 700 has a good identification capability. In addition, the optical identification module is easy to fabricate, so production costs can be reduced. In addition, the optical identification module 700 may further include other elements according to different requirements. For related instructions, refer to the foregoing descriptions, and the descriptions thereof are omitted herein.

Based on the above, in the optical identification module of the invention, a light beam transmitted to the sensor is collimated using the collimator to effectively relieve optical crosstalk, thereby reducing optical noise and improving an image resolution. In addition, the optical identification module is easy to fabricate, so production costs can be reduced. Therefore, the optical identification module of the invention can have a good identification capability, and is easy to fabricate, facilitating industrial competition and development.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. An optical identification module, comprising:
    a sensor comprising a sensing surface and a plurality of sensing regions, wherein the plurality of sensing regions are located on the sensing surface; and
    a collimator disposed on the plurality of sensing regions and comprising:
        a transparent substrate;
        a first light shielding layer disposed on the sensing surface, wherein the first light shielding layer comprises a plurality of first openings, and at least a portion of a region of each of the plurality of sensing regions is exposed from the plurality of first openings; and
        a plurality of microlenses disposed on a first surface of the transparent substrate, wherein the first light shielding layer is located between the plurality of microlenses and the plurality of sensing regions, and the plurality of microlenses correspond to the plurality of first openings respectively,
    wherein there is a pitch between adjacent ones of the plurality of sensing regions, and a diameter of each of the microlenses is less than or equal to the pitch.

2. The optical identification module according to claim 1, further comprising:
    an infrared cut-off sheet disposed on a second surface of the transparent substrate, wherein the second surface is opposite to the first surface; and
    an absorption layer disposed on the second surface of the transparent substrate, wherein the absorption layer is located between the second surface of the transparent substrate and the infrared cut-off sheet.

3. The optical identification module according to claim 1, wherein a ratio of the pitch to a width of each of the sensing regions is greater than a positive square root of 2.

4. The optical identification module according to claim 1, wherein a ratio of a thickness of the first light shielding layer to a width of each of the first openings is greater than a positive square root of 2.

5. An optical identification module, comprising:
a panel;
a sensor comprising a sensing surface and a plurality of sensing regions, wherein the plurality of sensing regions are located on the sensing surface; and
a collimator disposed on the plurality of sensing regions and comprising:
 a transparent substrate;
 a plurality of microlenses disposed on a first surface of the transparent substrate; and
 a first light shielding layer disposed on the panel and located between the plurality of microlenses and the panel, wherein the first light shielding layer comprises a plurality of first openings corresponding to the plurality of microlenses and at least portions of regions of the plurality of sensing regions respectively,
wherein there is a pitch between adjacent ones of the plurality of sensing regions, and a diameter of each of the microlenses is less than or equal to the pitch.

6. The optical identification module according to claim 5, further comprising:
an infrared cut-off sheet disposed on a second surface of the transparent substrate, wherein the second surface is opposite to the first surface; and
an absorption layer disposed on the second surface of the transparent substrate, wherein the absorption layer is located between the second surface of the transparent substrate and the infrared cut-off sheet.

7. The optical identification module according to claim 5, wherein a ratio of the pitch to a width of each of the sensing regions is greater than a positive square root of 2.

8. The optical identification module according to claim 5, wherein a ratio of a thickness of the first light shielding layer to a width of each of the first openings is greater than a positive square root of 2.

* * * * *